United States Patent [19]
Hoffman et al.

[11] Patent Number: 5,975,768
[45] Date of Patent: Nov. 2, 1999

[54] PEDAL BEARING SYSTEM FOR BICYCLE

[76] Inventors: Joachim Hoffman, Königsberger Str. 22, 58511 Lüdenscheid; Stefan Henkel, Nachrother Str. 11, 58769 Nachrodt-Wiblingwerde, both of Germany

[21] Appl. No.: 08/936,022

[22] Filed: Sep. 23, 1997

[30] Foreign Application Priority Data

Sep. 27, 1996 [DE] Germany .............. 196 40 030

[51] Int. Cl.$^6$ .................................................. F16C 19/08
[52] U.S. Cl. ............................................................ 384/545
[58] Field of Search .................................... 384/431, 545, 384/544, 540, 537

[56] References Cited

FOREIGN PATENT DOCUMENTS

| 3407120 | of 1984 | Germany . |
| 3441540 | of 1986 | Germany . |
| 9210135 U | 6/1992 | Germany . |

*Primary Examiner*—Lenard A. Footland
*Attorney, Agent, or Firm*—Pandiscio & Pandiscio

[57] ABSTRACT

This invention relates to a pedal bearing system for a pedal bearing housing of a bicycle pedal bearing, in which a cartridge case is used, with an outer bearing ring of an end of the pedal bearing including a case-centering ring that retains the cartridge case.

10 Claims, 2 Drawing Sheets

PEDAL BEARING SYSTEM FOR BICYCLE

BACKGROUND OF THE INVENTION

1. Field of the Invention

This invention relates to a pedal bearing system.

2. Description of the Prior Art

Such a pedal bearing system is known, for example, from DE-GM [German Utility Patent] 89 15 623. In principle this pedal bearing system is a so-called cartridge pedal bearing. It is important for this that there is a cartridge case that totally encloses the pedal bearing in the pedal bearing housing, in addition to the pedal bearing housing that is connected to the bicycle frame.

To be differentiated from this are the pedal bearing systems in which the outer rings of the bearing are incorporated in the fastening rings with which the pedal bearing is fastened to the pedal bearing housing of the bicycle frame.

In the known pedal bearing the bearing races are machined-turned on the pedal bearing axle and on the cartridge case. The pedal bearing system is then preassembled with the bearing balls and is ready for installation in the pedal bearing housing.

For this purpose one end of the cartridge case is threaded for screwing into the pedal bearing housing of the bicycle frame. The other end is encircled by a case-centering ring that is then likewise screwed into the pedal bearing housing.

Although the known cartridge pedal bearing has proved outstanding in practice, it is the purpose of this invention to improve the known pedal bearing so that the structural cost is reduced while retaining its reliability, and so that simplified assembly of the cartridge pedal bearing is nevertheless made possible.

SUMMARY OF THE INVENTION

The invention produces the benefit that for assembly, the pedal bearing axle can simply be pushed into the cartridge case from one end, and that the case-centering ring for the other end can then be pushed onto the cartridge case for centering together with the ball bearing located there, while at the same time the ball bearing at that position is mounted axially.

This benefit is achieved by the fact that the case-centering ring now also assumes the function of holding the outer ring of the ball bearing at that position.

The case-centering ring accordingly has a double function in this invention. On the one hand it is used to hold the cartridge case to center it, and it also provides the capability of screwing the pedal bearing preassembled in this way to the pedal bearing housing of the bicycle frame.

For this purpose the case-centering ring has an inner bore that conforms to the outside diameter of the cartridge case at its free end, while at the same time the outer ring of the bearing race of the ball bearing at that position is provided at the bottom of the inner bore.

The screw-in thread for the pedal bearing housing of the bicycle frame is also provided on the outer circumference of the case-centering ring.

It thus comes down to the fact that there is another annular groove at the bottom of the centering seat of this case-centering ring that serves either by itself as the outer bearing ring of the ball bearing in question, or serves to hold it.

It is desirable for the bore diameter of the centering seat for the cartridge case on the fastening ring to be greater than the bore diameter for holding the outer bearing ring in question, so that during assembly of the cartridge pedal bearing this fastening ring can simply be pushed onto the end of the cartridge case that is still not closed.

To fasten this fastening ring to the cartridge case it is sufficient to provide a connecting slot with a transition fit, or the fastening ring can be connected to the cartridge case through matching screw threads.

To further simplify assembly, the outer bearing ring of the other end of the pedal bearing can also be in a bearing sleeve that is flanged at the end so that a bearing seat is produced on its inner circumference. The bearing sleeve is then pushed into the open end of the cartridge case and thus offers a steel bearing seat resistant to wear inside the cartridge case, which is preferably flanged at this end so that the steel bearing sleeve is held fast axially.

This refinement in particular offers the advantage that in contrast to the material of the bearing sleeve, the cartridge case can be made of plastic.

This principle can also be applied on the second end of the pedal bearing. At that position, the case-centering ring can be made of a plastic part and the outer bearing ring can be made from a steel ring that is seated in the plastic part, preferably with plastic injection-molded around it.

In this way a low-weight cartridge pedal bearing is obtained that offers high wear resistance along with simplified assembly.

Considering also the fact that the pedal bearing assembly requires some axial play that can be attributed on the one hand to different pedal bearing widths and on the other hand to different tolerances within the pedal bearing widths, it is also proposed to provide the case-centering ring of the second end of the pedal bearing with some axial clearance relative to the end of the cartridge case at that position. The cartridge pedal bearing can then be fitted directly to the actual widths of the pedal bearing housing within the axial clearance.

Furthermore, to arrive at simplified assembly at low cost, the inner bearing races of the ball bearings should consist of shoulders on the pedal bearing axle that are shaped by upsetting.

The production precisions produced by this are completely adequate for most customary pedal bearings. The shaping of the bearing shoulders can be accomplished practically in one step with the shaping of the crank ends of the pedal bearing axle.

Although the invention can be implemented for roller-type bearings of various types, e.g. cylindrical bearings or tapered roller bearings, it is advantageous to provide separable ball bearings because not only can all radial forces be absorbed, but also axial forces to some extent.

BRIEF DESCRIPTION OF THE DRAWINGS

The invention will be explained in further detail below with reference to examples of embodiment. The Figures show.

Figure 1:
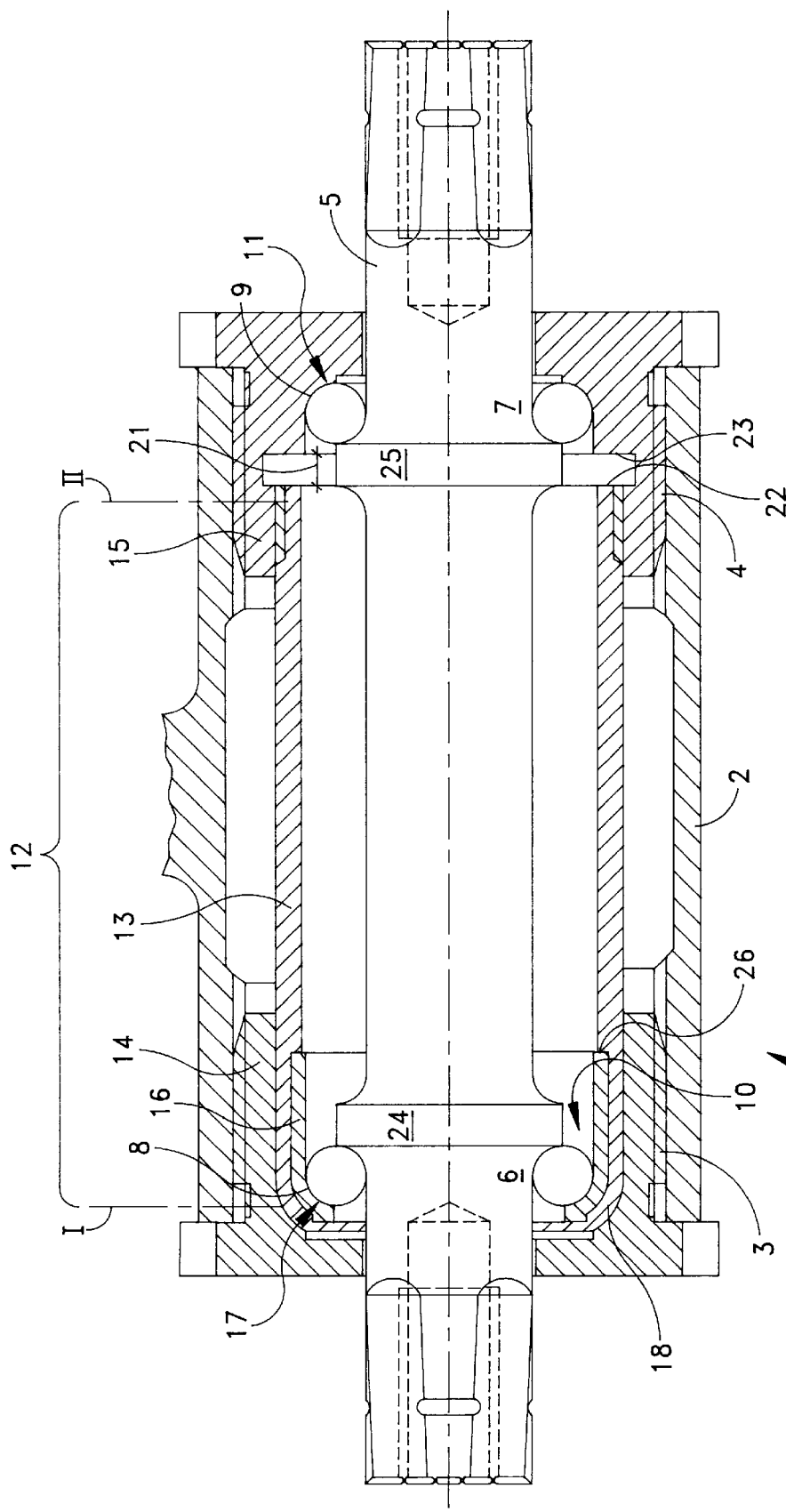
FIG. 1 a first example of embodiment of the invention.

If not otherwise stated below, the following description applies to all of the figures.

DESCRIPTION OF THE PREFERRED EMBODIMENTS

The figures show a pedal bearing system 1, as it would be arranged in a pedal bearing housing 2 of a bicycle frame.

The pedal bearing system 1 is fastened to the pedal bearing housing 2 by case-centering rings 14, 15 positioned at the ends, which have first and second screw threads 3 and 4 on their outer circumferences.

The heart of such pedal bearing systems 1 is the pedal bearing axle 5, which has inner bearing races 6 and 7 at its ends for ball bearings 10 and 11. The outer rings 8 and 9 of the bearings 10 and 11 are connected through the pedal bearing cartridge 12, which is independent of the pedal bearing housing 2.

An important component of the pedal bearing cartridge 12 is the cartridge case 13, which encloses the entire pedal bearing system like a sleeve and is sealed from the outside.

The cartridge case 13 is enclosed by case-centering rings 14 and 15 pushed on from the ends. For this purpose the case-centering rings 14, 15 have inside diameters with a fitted seat that matches the particular outside diameter of the cartridge case 13.

FIG. 1 also shows that the connection between the second case-centering ring 15 and the cartridge case 13 can be provided by matched screw threads.

It is important then for the two case-centering rings 14 and 15 to hold the cartridge case 13 on the inside, while on the outside they are connected to the pedal bearing housing 2 by matching screw threads.

Accordingly, the two case-centering rings 14 and 15 have a double function. While they are used on the inside to hold the cartridge case 13 with no clearance, their outer threads provide a suitable connection to the pedal bearing housing 2.

However, the second case-centering ring has still another function. Specifically, this second case-centering ring 15 is used in addition to constitute the outer bearing ring 9 of the ball bearing on this end of the pedal bearing, so that the second case-centering ring 15 can be pushed easily over the open end of the cartridge case, while at the same time the ball bearing becomes effective.

For this purpose the inside diameter of the second bearing case-centering ring 15 facing axially toward the interior of the pedal bearing is at least as large as the outer circular envelope of the bearing balls.

Furthermore, both examples of embodiment have the feature that the outer bearing ring 8 of the first end of the pedal bearing I is seated at its outer end in a bearing sleeve 16 flanged at that position that is seated as pushed into the cartridge case 13 of the pedal bearing cartridge. In this way, the differing requirements for the cartridge case 13 on the one hand and the outer bearing ring 8 on the other hand can also be separated with regard to materials.

The outer bearing ring 8 is suitably made of steel. The cartridge case 13 can consist of plastic.

To fasten the bearing sleeve 16 axially, the end of the cartridge case 13 at that position can also be a part flanged around the flanged area of the bearing sleeve 16 to keep it from falling out axially.

The outer end 17 of the bearing sleeve 16 together with the flanged end 18 of the cartridge case 13 is kept clean and tight by the inner, tightly fitted contour of the first case-centering ring 14 on the cartridge case 13, particularly in its flanged end area 18, so that the ball bearing can operate without play even under the bearing loads that occur.

The second end of the pedal bearing is designed differently in the two different examples of embodiment.

In this regard, FIG. 1 shows that the second outer bearing ring 9 is materially integrated into the second case-centering ring 15. The second case-centering ring can accordingly be made of steel.

Figure 2:
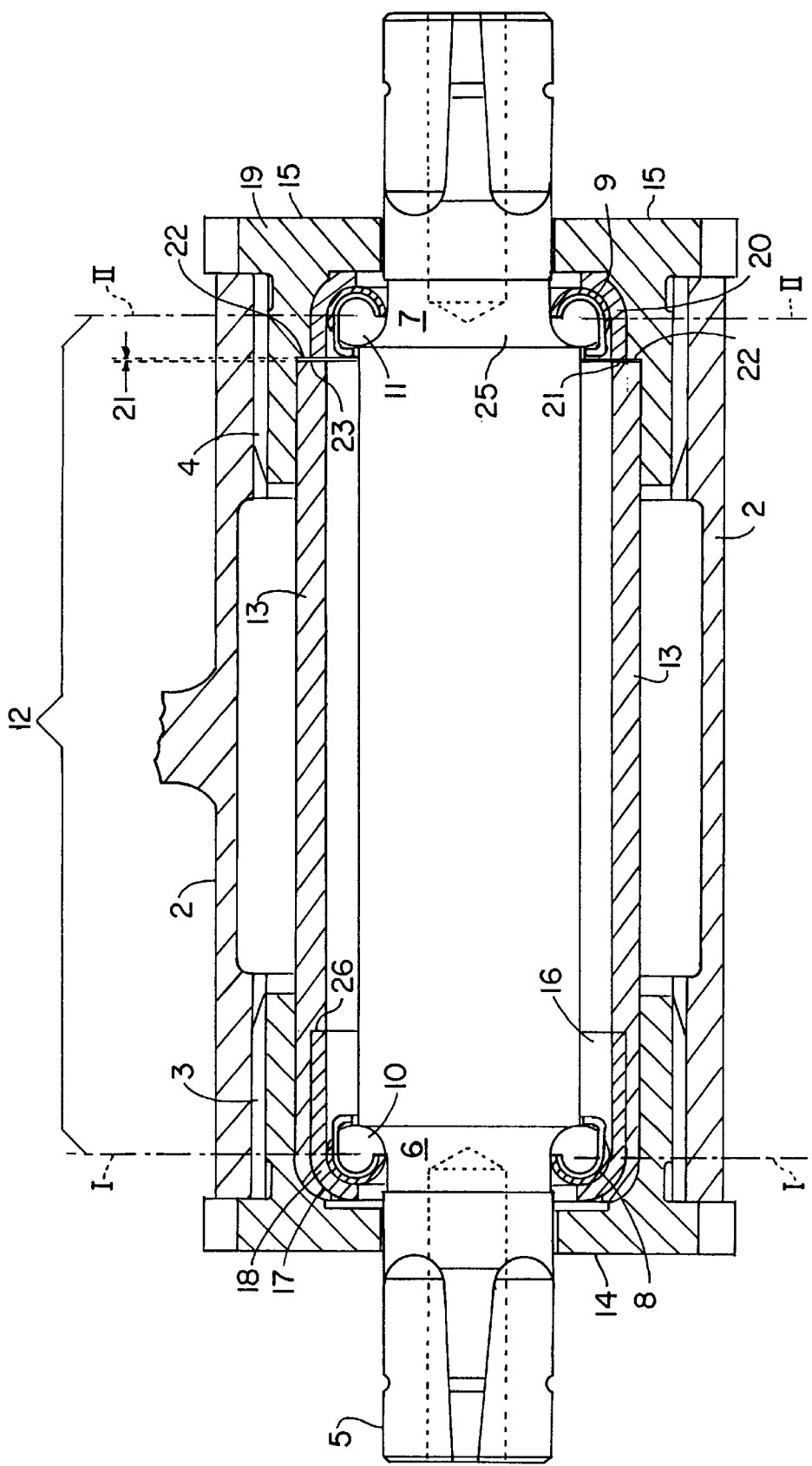
FIG. 2 another example of embodiment of the invention.

A design differing from this is shown in FIG. 2; in that case the case-centering ring 15 is made of an outer plastic part 19 and an outer bearing ring 9 seated in it that in this case is composed of a steel ring 20. The steel ring can be cemented into the plastic part 19, or it can be clamped in place. It is desirable for the steel ring 20 to be surrounded by the injection-molded plastic part 19.

Both of the examples of embodiment shown also reveal that the second case-centering ring 15 can be assembled to the cartridge case 13 of the pedal bearing cartridge with axial clearance 21 in the range of the production-related axial spacings of the ball bearings 10 and 11 in the assembled state.

Accordingly, the assembled spacing of the two case-centering rings 14 and 15 is dictated solely by the width of the pedal bearing housing 2, while the length of the cartridge case 13 is so limited that even with the smallest spacing of the case-centering rings 14 and 15 that occurs, the cartridge case 13 is actually enclosed firmly all around, but is seated without limiting stops in its seat on the second case-centering ring 15.

Accordingly the end face 22 of the cartridge case 13 in the assembled state is positioned in a contactless manner against the bottom end of the associated receiving bore of the case-centering ring 15.

The annular bottom 23 of the cutaway is therefore at most contacted by the end face 22 of the cartridge case 13, but this is with the exclusion of any axial compression forces.

In any case, the version shown, in which some separation is maintained in the assembled state between the end face 22 of the cartridge case 13 and the annular bottom 23 of the cutaway on the second case-centering ring 15, is better.

FIG. 1 also shows that the inner bearing races 6 and 7 of the ball bearings are composed of the upset shoulders 24 and 25. In departure from this, FIG. 2 shows that the inner bearing races 6 and 7 can also be machined into the material of the pedal bearing axle 5.

However, it is characteristic of both examples of embodiment that the rolling-type bearings are designed as separable ball bearings. This has the advantage that in addition to the radial bearing forces, axial forces can also be intercepted reliably while at the same time the axial bearing clearance can be set sensitively. To this end, the screw-in depth of the second case-centering ring 15 is less than the maximum thread length with which it can be screwed into the pedal bearing housing 2.

With regard to function:

The bearing sleeve 16 of the first end I of the pedal bearing is pressed into the open end of the cartridge case 13. The end positioned there is then flanged around the inserted bearing sleeve 16 so that it is held firmly against the inner-end step 26 of the cartridge case 13.

The first case-centering ring 14 is then pushed over the open end of the premanufactured cartridge case. The inner contour of the first case-centering ring 14 is seated tightly on the outer contour of the cartridge case 13 including the contour of the flanged end 18. In this way, an intimately telescoped subassembly is formed in the area of the bearing balls of the first end of the pedal bearing, consisting of the bearing sleeve 16, cartridge case 13, and the first case-centering ring 14.

In the examples of embodiment shown, the circular envelope of the bearing balls at this end I of the pedal bearing is at most no larger than the smallest inside diameter of the cartridge case 13 premanufactured in this way, with bearing sleeve 16. Accordingly, the bearing ball retainer can then be inserted.

The pedal bearing axle 5 can then be pushed in so that the first ball bearing 10 can already perform its function.

The second case-centering ring 15 is then likewise equipped with its ball bearing 11. For this purpose the inside diameter of the second case-centering ring 15 is tapered from the outside inward to the circular envelope needed by the bearing balls, to roll on the outer bearing ring 8 located there.

Since the largest outside diameter of the second case-centering ring 15 is larger than the circular envelope of the bearing balls, or at least of equal size, the second case-centering ring 15 can then be placed easily over the open end of the cartridge case 13 and is already seated there securely, so that the two case-centering rings 14, 15 can then be screwed toward one another until their inner faces rest tightly on the face surfaces of the pedal bearing housing.

Since the cartridge case 13 is also constructed with axial rigidity, the axial clearance 21 between the end face 22 of the cartridge case 13 and the annular bottom 23 of the corresponding cutaway in the second case-centering ring 15 is needed to avoid multiple fits.

We claim:

1. A pedal bearing system (1) comprising a pedal bearing housing (2), a pedal bearing axle (5) disposed in said housing, said axle having first and second bearing races (6, 7) thereon, ball bearings (10, 11) disposed in said races (6, 7), respectively, bearing surfaces (8, 9) respectively retaining said ball bearings (10 11), a cartridge case 13 enclosing the ball bearings in said bearing race (6) in sleevelike fashion, said cartridge case (13) being seated at each end in a case-centering ring (14, 15) each held in the pedal bearing housing (2) by screw threads (3, 4), said ball bearing (10) in the first bearing race (6) being retained by said bearing surface (8) disposed in a bearing sleeve (16) fixed to the cartridge case (13), wherein the cartridge case (3 has an inner step (26) at a first end thereof against which the bearing sleeve (16) is held in place axially, and wherein the bearing surface (9) disposed at a bottom of an inner bore of the case-centering ring.

2. The pedal bearing system in accordance with claim 1, wherein the bearing surface (8) is seated in said bearing sleeve (16) which is flanged to retain said ball bearing (10) and which is pressed into the cartridge case (13).

3. The pedal bearing system in accordance with claim 2, wherein the case-centering ring (14) encloses the cartridge case (13) together with the bearing sleeve (16), and wherein the cartridge case (13) is bent around the bearing sleeve (16).

4. The pedal bearing system in accordance with claim 2, wherein the case-centering ring (15) ends opposed to an end face (22) of the cartridge case (13) with axial clearance (21) therebetween within a selected range of manufacturing tolerance of the ball bearings.

5. The pedal bearing system in accordance with claim 1, wherein the case-centering ring (15) consists of a plastic part (19) and a steel ring (20) that is seated in the plastic part (19).

6. The pedal bearing system in accordance with claim 4, wherein the steel ring (20) is cemented into the plastic part (19).

7. The pedal bearing system in accordance with claim 4, wherein the steel ring (20) is clamped into the plastic part (19).

8. The pedal bearing system in accordance with claim 5, wherein the steel ring (20) is surrounded by the plastic part (19).

9. The pedal bearing system in accordance with claim 1, wherein the inner bearing races (6, 7) of the ball bearings (10, 11) are formed in part by shoulders (24, 25) on the pedal bearing axle (5).

10. The pedal bearing system in accordance with claim 1, wherein the ball bearings (10, 11) are separable.

* * * * *

UNITED STATES PATENT AND TRADEMARK OFFICE
CERTIFICATE OF CORRECTION

PATENT NO. : 5,975,768
DATED : November 2, 1999
INVENTOR(S) : Joachim Hoffman et al It is certified that error appears in the above-identified patent and that said Letters Patent is hereby corrected as shown below:

Claim 1, column 5, line 35, "(3" should be --(13)--.

Claim 1, column 6, line 2, after "(9)" insert -- is --.

Claim 1, column 6, line 3, after "ring" insert --(15)--.

Claim 6, column 6, line 20, "4" should be -- 5 --.

Claim 7, column 6, line 23, "4" should be -- 5 --.

Signed and Sealed this

Thirtieth Day of May, 2000

Attest:

Q. TODD DICKINSON

*Attesting Officer*     *Director of Patents and Trademarks*